No. 766,727. PATENTED AUG. 2, 1904.
W. S. PROSKEY.
HYDROCARBON INCANDESCENT LAMP.
APPLICATION FILED JAN. 9, 1900. RENEWED JAN. 30, 1902.
NO MODEL.
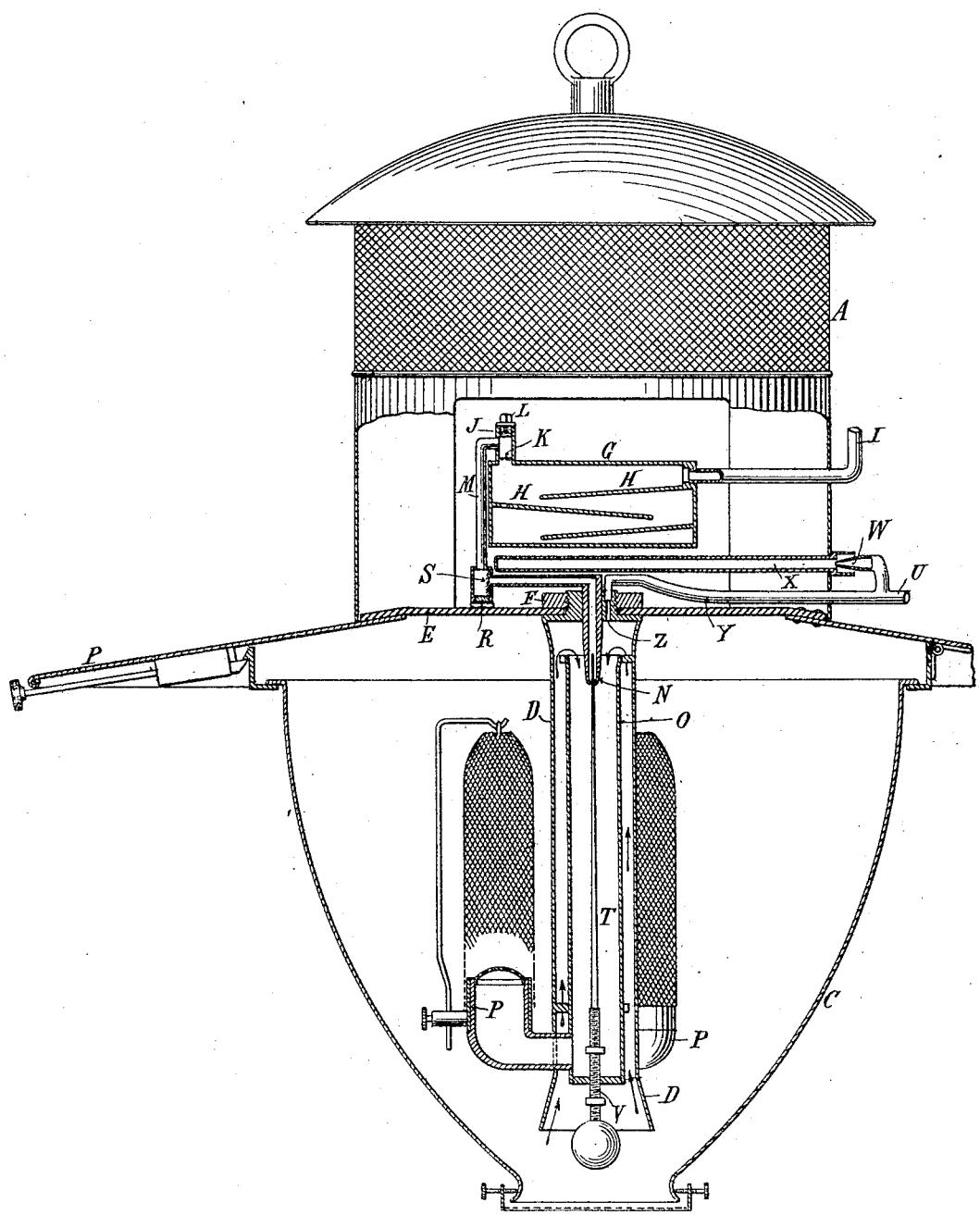
Witnesses:
Inventor No. 766,727. Patented August 2, 1904.

UNITED STATES PATENT OFFICE.

WINFIELD SCOTT PROSKEY, OF OCALA, FLORIDA, ASSIGNOR, BY MESNE ASSIGNMENTS, TO THE PROSKEY LIGHT COMPANY, OF JERSEY CITY, NEW JERSEY, A CORPORATION OF NEW JERSEY.

HYDROCARBON INCANDESCENT LAMP.

SPECIFICATION forming part of Letters Patent No. 766,727, dated August 2, 1904.

Application filed January 9, 1900. Renewed January 30, 1902. Serial No. 91,909. (No model.)

*To all whom it may concern:*

Be it known that I, WINFIELD SCOTT PROSKEY, a citizen of the United States, and a resident of Ocala, in the county of Marion and State of Florida, have invented certain new and useful Improvements in Hydrocarbon Incandescent Lamps, of which the following is a specification, reference being had to the drawing accompanying and forming a part of the same.

In the several patents heretofore granted to me I have shown and described forms of hydrocarbon incandescent lamp of that general class in which an oil vaporized by the heat of the burner is mixed with air after having been brought to a gaseous state and burned in proximity to a refractory incandescing mantle. My present application is based upon further improvements which I have invented and applied to lamps of this character, said improvements comprising in the main a novel form of vaporizer or gas-generating device, a modified and improved means for effecting the admixture of air with the vaporized oil, and a novel construction and arrangement of the means for starting or igniting the lamp. These improvements are shown in, and I shall now describe them by reference to, the accompanying drawing, which is a vertical central section of the complete lamp constructed in accordance with my invention.

A is a casing composed in whole or in part of perforated sheet metal or of wire-gauze, which surmounts a shade P. Beneath the latter is attached in any suitable manner a globe C, which incloses the burner or burners, the latter being supported by a tube D, passing through a central opening in a spider E, to which it is fixed by a nut F.
Within the casing A and supported in any convenient manner therein above the burners is a metallic box G, which constitutes the vaporizing-chamber or gas-generator. A pipe I from a suitable reservoir is arranged to conduct to the upper portion of the vaporizer G a hydrocarbon oil and to deliver it on the upper surface of an inclined plate H, extending across the interior of the box G and forming one of a series of similar inclined shelves or plates within said box, all of such width as to overlap and form a circuitous path for the oil in its course toward the bottom of the box. From a point preferably on the upper side of the box G extends a vertical pipe J, containing a wire-gauze or strainer K and closed by a removable plug L. From this tube a gas tube or pipe M leads downward along the side of the box G and then horizontally to the center of the spider E, where it is again bent and extends down into the tube D, in which it terminates in a nozzle N. The tube B is open at its lower end and contains a smaller tube O, supported concentrically within it and open at its upper end, into which the nozzle N extends. The lower end of the tube O is closed, and from it lead branch tubes, which support or terminate in the burners P.

In the pipe M, preferably at the end of the vertical portion of the same, there is formed a pocket which is closed by a plug R, and a second strainer or piece of wire-gauze S is inserted in the pipe at this point.

The purpose of the wire-gauze screens or strainers K and S is to intercept any particles of dust or solid matter which may be carried off with the vaporized oil and to prevent them from reaching the nozzle N. The plugs L and R are removed when occasion requires to gain access to the interior of the pipe M or the pocket which it contains to remove any solid matter which may accumulate therein.

The nozzle N is closed by a needle-valve carried by a stem T, which has a threaded portion V working through the bottom of tube O.

The devices for starting the lamp are as follows: A tube U, which is connected with a street main or any other source of combustible gas, is branched at a point close to the lamp-casing, one branch being formed with a nozzle W, projecting into the open end of a tube X within the casing A and extending under the box G, where it contains a number of perforations, thus forming a Bunsen burner. The other branch, Y, leads to the tube D, through the upper closed end of which it passes alongside of the nozzle N and into which it opens through a contracted orifice Z in line with the tube O.

The purposes of the construction above described and the operation of the same are as follows: When it is desired to start the lamp, a gas under pressure is introduced through the tube U and permitted to flow through its two branches. That portion which passes through the upper branch issues as a jet from the jet-nozzle W into the tube X and drawing in with it a certain proportion of air escapes through the perforations in the tube X. The remainder of the gas following the branch Y issues through the orifice Z in a jet of sufficient force to carry it down through the tube O along with a certain proportion of air to the burners. The gas that issues from the tube X and that which comes through the burners is then ignited, with the result that the vaporizer G and the tubes M and D are quickly heated. As soon as the parts named have by this means been brought to the proper temperature the oil is permitted to flow through the pipe I into the vaporizer G. Here it spreads over the surface of the upper plate H and flowing down its inclined surface drops upon the second plate and in like manner upon the third plate and finally to the bottom of the box. In its course it encounters a gradually-increasing temperature, and at a certain point it will begin to be vaporized and pass off through the tube M. In the latter it will be still further heated and will issue from the nozzle N. The force of the jet issuing from the nozzle N carries down through the tube O a considerable quantity of air, the supply of air being facilitated by the heating of the tube D, which tends to create an upward current of air around the sides of the tube O, and the mixed gas and air thus produced will be distributed to the burners and there consumed. As soon as the vaporized oil reaches the burners, as will be evidenced by the character of the light, the supply of gas used for starting the lamp is shut off, and the lamp will thereafter continue to burn, supplying the heat necessary for the continued vaporization of the oil. By the means above described light will be obtained from the burners very quickly.

The form and specific construction of the frame and of the lamp proper may be greatly modified without departing from the invention, and this will be readily understood from the nature of the novel features of the invention, which are pointed out in the claims.

What I claim is—

1. In a hydrocarbon incandescent lamp, the combination with one or more burners, of a vaporizer in a position where it receives heat directly from the burners, said vaporizer containing a series of plates over which the oil flows toward the point of highest temperature, and having an oil-inlet and a gas-outlet above the plates, a mixing-tube in communication with the burners, a gas-tube leading from the gas-outlet and discharging into the mixing-tube, and having a pocket to intercept solid particles arranged in the gas-tube intermediate the gas-outlet of the vaporizer and the mixing-tube, as set forth.

2. In a hydrocarbon incandescent lamp, the combination with one or more burners, of a vaporizer placed directly over said burners and containing a series of plates or shelves over which the oil flows in succession toward the point of highest temperature, and having an oil-inlet and a gas-outlet above the plates, a mixing-tube in communication with the burners, a gas-tube leading from the gas-outlet and discharging into the mixing-tube, and having a pocket to intercept solid particles arranged in the gas-tube intermediate the gas-outlet of the vaporizer and the mixing-tube, as set forth.

3. In a hydrocarbon incandescent lamp, the combination with one or more burners, of a vaporizer placed directly over said burners and containing a series of overlapping inclined plates over which the oil flows in succession in its course toward the bottom of the vaporizer, and having an oil-inlet and a gas-outlet above the plates, a mixing-tube in connection with the burners, a gas-tube leading from the gas-outlet and discharging into the mixing-tube, and having a pocket to intercept solid particles arranged in the gas-tube intermediate the gas-outlet of the vaporizer and the mixing-tube, as set forth.

4. In a hydrocarbon incandescent lamp, the combination with one or more burners, of a vaporizer placed above the burners, a tube extending downwardly along the sides of the burners and open at the bottom, an inner tube of smaller diameter, leaving an annular space between the outer and inner tubes, leading to the burners and open at the top and a gas pipe or tube terminating in the open end of the said inner tube in a nozzle, said outer tube extending beyond the open end of the inner tube, and adapted to receive air at its other end, as set forth.

5. In a hydrocarbon incandescent lamp, the combination with a depending tube open at the bottom, of a tube of smaller diameter arranged concentrically therein, the said inner tube being open at the top and communicating at its lower end with the burners, one or more burners arranged alongside of the depending tube, a vaporizer in position to be heated by the burners, and a gas-tube therefrom entering the open end of the said inner tube, whereby a jet of gas issuing from said nozzle will flow to the burners and draw with it heated air which rises in the space between the inner and outer tubes, as set forth.

WINFIELD SCOTT PROSKEY.

Witnesses:
M. LAWSON DYER,
DRURY W. COOPER.